United States Patent [19]

Berglund

[11] 4,378,340

[45] Mar. 29, 1983

[54] METHOD OF PURIFYING PHOSPHORIC ACID OF HEAVY METALS

[75] Inventor: Hans A. L. Berglund, Helsingborg, Sweden

[73] Assignee: Boliden Aktiebolag, Stockholm, Sweden

[21] Appl. No.: 220,060

[22] PCT Filed: May 8, 1980

[86] PCT No.: PCT/SE80/00134

§ 371 Date: Jan. 10, 1981

§ 102(e) Date: Dec. 12, 1980

[87] PCT Pub. No.: WO80/02418

PCT Pub. Date: Nov. 13, 1980

[30] Foreign Application Priority Data

May 10, 1979 [SE] Sweden ................................ 7904135

[51] Int. Cl.$^3$ .............................................. C01B 25/16
[52] U.S. Cl. .................... 423/321 R; 423/34; 423/87; 423/92; 423/101; 423/140
[58] Field of Search .................. 423/320, 321 R, 101, 423/166, 167, 158, 87, 92, 34, 140

[56] References Cited

U.S. PATENT DOCUMENTS

| | | |
|---|---|---|
| 935,337 | 9/1909 | Thwaites ............................ 423/101 |
| 1,473,641 | 11/1923 | Pohl . |
| 1,783,757 | 12/1930 | Farbenfabrieken . |
| 1,787,192 | 12/1930 | Fiske ................................. 423/321 R |
| 2,183,924 | 12/1939 | Schoch . |
| 3,205,589 | 9/1965 | Fies et al. . |
| 3,685,964 | 8/1972 | Treitler ................................. 423/158 |
| 4,134,962 | 1/1979 | Ehlers et al. ..................... 423/321 R |

FOREIGN PATENT DOCUMENTS

| | | |
|---|---|---|
| 817590 | 7/1949 | Fed. Rep. of Germany . |
| 2429758 | 1/1975 | Fed. Rep. of Germany . |
| 37857 | 4/1912 | Sweden . |
| 190035 | 6/1964 | Sweden . |
| 393676 | 5/1977 | Sweden . |
| 401668 | 5/1978 | Sweden . |
| 6751 | of 1884 | United Kingdom . |
| 986154 | 3/1965 | United Kingdom . |

*Primary Examiner*—O. R. Vertiz
*Assistant Examiner*—Gregory A. Heller
*Attorney, Agent, or Firm*—Stevens, Davis, Miller & Mosher

[57] ABSTRACT

The present invention relates to a process for removing heavy metals, particularly cadmium, from differing qualities of wet-process phosphoric acids. The invention is based on the concept of removing the heavy metals in sulfide form.

10 Claims, No Drawings

METHOD OF PURIFYING PHOSPHORIC ACID OF HEAVY METALS

Phosphate raw materials contain varying quantities of heavy metals which, when digesting the phosphate raw material in acid, such as sulphuric acid, are dissolved and remain in the resultant phosphoric acid solution. When using the phosphoric acid in, for example, the production of fertilizers, animal foods and other more qualified end products, the heavy metals will be present in the end product. Studies made in the agriculture industry on the problem of heavy metals over recent years have shown that more attention should be paid to the cadmium situation. The bonds by which cadmium ions are bound to the ground are relatively weak and consequently cadmium can be readily taken up by plant growing in the ground and, in this way, passed to the nutrient chains via the ground, the animal food and the vegetables intended for human consumption. The element cadmium is considered particularly dangerous, due to its long biological half life. It has been found that the long term exposure of cadmium to animals has, for example, resulted in proteinuri and kidney damage. Another known sickness promoted by cadmium is the so-called Itai-Itai-sickness in Japan, caused by the release of industrial cadmium and resulting in kidney damage and serious changes in bone structure. Thus, there are strong reasons to prevent, as far as possible, the entrance of cadmium into the various steps of the nutrient chain.

As before mentioned, cadmium and other heavy metals are present in the majority of phosphate raw materials and the heavy metal composition of some of such raw materials is listed below in table 1.

TABLE 1

| Element | Kola apatite | Khouribga phosphate BPL* 70/72 | Taiba | Florida phosphate 72% BPL* | Florida phosphate 75% BPL* |
|---|---|---|---|---|---|
| $P_2O_5$, % | 39.1 | 31.6 | 36.9 | 33.3 | 34.5 |
| As, $\mu g/g$ | 0.7 | 12.5 | 2.2 | 3.6 | 5.3 |
| Cu, $\mu g/g$ | 29 | 39 | 51 | 7.0 | 7.0 |
| Cd, $\mu g/g$ | <0.2 | 14 | 66 | 8.0 | 9.0 |
| Pb, $\mu g/g$ | 2.0 | 3.0 | 4.0 | 15 | 15 |
| Hg, $\mu g/g$ | <0.01 | 0.04 | 0.5 | 0.12 | 0.10 |

*BPL = Bone Phosphate Lime (% $Ca_3(PO_4)_2$)

Cadmium and other heavy metals, such as arsenic, copper, lead and mercury, remain, to a large extent, in the phosphoric acid prepared from the phosphate raw materials. Table 2 below illustrates a heavy-metal content of phosphoric acid, which content is depending upon the raw material.

TABLE 2

| Element | Khouribga phosphoric acid (1) | Kola phosphoric acid | Khouribga phosphoric acid (2) |
|---|---|---|---|
| $P_2O_5$, % | 53.0 | 53.5 | 31.4 |
| As, $\mu g/g$ | 14 | 1.2 | 9.2 |
| Cu, $\mu g/g$ | 45 | 14 | 18 |
| Cd, $\mu g/g$ | 14 | 0.5 | 9.2 |
| Pb, $\mu g/g$ | 0.4 | 2.2 | 0.2 |
| Hg, $\mu g/g$ | 0.002 | 0.005 | 0.001 |

N.b. (1) Evaporated phosphoric acid, hemihydrate process
(2) Non-evaporated phosphoric acid, dihydrate process.

Various methods of purifying phosphoric acid with respect to its heavy metal content are known to the art. Normally the various heavy metals, with the exception of cadmium, can be readily precipitated out and removed from the phosphoric acid, by, for example, adding hydrogen sulphide, sodium sulphide solution, potassium sulphide solution or an ammonium sulphide solution, or by adding calcium and barium sulphide. Cadmium is much more difficult to precipitate out than the other heavy metals mentioned.

In the known technique there are only three methods for removing cadmium from phosphoric acid which, according to results shown, provide acceptable residual contents of cadmium in the purified phosphoric acid. One method (disclosed in Japanese patent specification No. 7575-115) is based on the concept of adding a large quantity of sodium sulphide to the phosphoric acid, cadmium sulphide being precipitated out in an autoclave at overpressure. The overpressure is probably necessary in order to reduce the solubility of the resultant cadmium sulphides in the phosphoric acid. The method requires a large surplus of sulphide in relation to the heavy metals, and, subsequent to filtering off the sulphides, results in the presence of hydrogen sulphide in the acid, which hydrogen sulphide must be removed. The hydrogen sulphide can, for example, be driven off with air or removed by oxidation. This procedure is particularly disadvantageous in practice. From the aspect of working hygiene and from the point of view of the care and protection of the environment, the handling of hydrogen sulphide is a serious matter.

Another Japanese patent specification, No. 53075-196, proposes a method in which water-soluble metal sulphides are first pre-mixed with a calcium hydroxide suspension. This mixture is then added to the phosphoric acid, whereby cadmium sulphide, together with other heavy metals, are precipitated out and then separated. The examples given illustrate that acceptable purification with regard to cadmium is obtained at molar ratios of $Ca/SO_4^{2-}$ of 0.5; 1.0, and 1.5 and a molar ratio of $S^{2-}$/heavy metals greater than 10.

This latter methodology, has been found applicable only to acids of particular composition. Thus, experiments show that the method cannot be used on wet-process phosphoric acid produced from the raw materials specified in Table 1 above. Since these raw materials are the most common when seen commercially, at least in Europe, the Japanese method has a very limited field of use. The method was applied experimentally on differing qualities of wet-process phosphoric acid, obtained from the raw materials recited in Table 1. The results of these experiments are shown in Example 10 below, from which it can be seen that no satisfactory removal of cadmium could be obtained.

The third method (German Offenlegungsschrift No. 2422902) is based on the concept of passing sulphuric acid under pressure (1–50 atm) down into the phosphoric acid and then removing the cadmium sulphide formed. This method has the same disadvantage as the method disclosed in the aforementioned Japanese Patent Specification No. 7575-115. The phosphoric acid was not satisfactorily purified of cadmium.

An object of the present invention is to provide a method by which wet-process phosphoric acid can be freed of heavy metals, particularly cadmium, irrespective of the phosphate raw material used in producing the phosphoric acid, and without needing to apply the difficult process steps associated with known techniques.

As is generally known, wet-process phosphoric acid produced by digesting raw phosphates with sulphuric acid always contains sulphuric acid residues. In accordance with the method of the present invention, the residual sulphuric acid present in the phosphoric acid is first removed, which can be effected, in principle, in two different ways, namely by neutralization with alkali or by precipitation as not-readily dissolved sulphate. Subsequent to removing the sulphuric acid, the phosphoric acid is admixed with alkali to an Me/P ratio within the range of about 0.05–0.3, preferably about 0.1–0.2; in which Me represents the number of cation equivalents in the alkaline solution used, while P represents the number of phosphorus atoms in the phosporic acid. After adding the alkali, the heavy metals are precipitated out in the phosphoric acid by adding thereto a sulphide compound which is soluble in the phosphoric acid and by then removing the resultant sulphide precipitant in a suitable manner. In practice, the sulphide is suitably supplied in an excess quantity, the amount added preferably being selected so as to correspond to about 0.2–1 g of $S^{2-}$ per liter of phosphoric acid.

When the method selected for removing residual sulphuric acid from the phosphoric acid is by precipitating out not-readily dissolved sulphate, the alkali addition may conveniently be effected in two stages, whereat in the first stage a stoichiometric quantity of salt-forming cations corresponding to the residual sulphuric acid is added and the resultant sulphate separated out, while in the second stage further alkali is added to produce an Me/P ratio within said interval, or, alternatively, the alkali addition can be made in a single step while neutralizing the residual sulphuric acid to obtain the Me/P ratio.

A multiplicity of alkaline compounds, such as ammonium hydroxide, sodium hydroxide or potassium hydroxide or mixtures thereof, can be used for neutralizing the sulphuric acid or for the addition of alkali to obtain the desired Me/P ratio. Alternatively, calcium hydroxide, calcium carbonate or calcium oxide, or a mixture thereof, can be used. The kind of alkaline compound added is suitably selected with respect to the future use of the phosphoric acid. Thus, for example, it the phosphoric acid is to be used for the preparation of calcium phosphate, the alkali added is suitably a calcium compound, for example one of those beforementioned.

When the residual sulphuric acid present in the phosphoric acid is removed by precipitation of the not-readily dissolved sulphate, there can be suitably used calcium or barium compounds, such as hydroxides, carbonates or oxides thereof. The precipitated sulphate can be removed in a suitable manner, for example by filtration. Any suitable soluble sulphide compound can be used to precipitate out the heavy metals, among them cadmium, present in phosphoric acid prepared in the afore described manner. As examples of suitable sulphide compounds can be mentioned sodium sulphide, potassium sulphide, ammonium sulphide, calcium sulphide or hydrogen sulphide.

In conjunction with the advent of the present invention it was discovered that if the phosphoric acid contains minor quantities of cadmium, e.g. about 10 μg per gram phosphoric acid and if the weight ratio of Cd:(As+Cu) is less than about 0.5 the precipitation of cadcan be facilitated by adding large excess quantities of the sulphide compound in relation to the heavy metals present. This is particularly the case when the Me/P molar ratio is less than about 0.1. In practice, it is suitable to add about twice the amount of sulphide compared with the afore mentioned normal quantity of about 0.2–1 g of $S^{2-}$ per liter of acid.

The invention will now be described in more detail with reference to a number of examples, which should not be considered limitive of the invention.

Example 10 is intended to illustrate the unsatisfactory purification of phosphoric acid with respect to cadmium obtained when applying the afore described known techniques.

EXAMPLE 1

1000 ml of wet-process phosphoric acid, containing 53.5% $P_2O_5$, 3.0% $H_2SO_4$ and 16 mg As, 17 mg Cu, 25 mg Cd, calculated per liter of acid, were admixed with lime milk to a molar ratio of Ca/$SO_4$ of 1.0. The gypsum precipitate was removed by filtering after a reaction time of 1 hour at 50° C. The phosphoric acid purified of sulphate was admixed with sodium hydroxide to obtain an Na:P molar ratio of 0.10, whereafter 1 gram of commercially available sodium sulphide (as a 5% $Na_2S$ solution) was added. This solution was introduced close to the bottom of the reaction vessel. After a reaction time of 2 hours at 50° C., the heavy metal sulphides precipitated out were removed by filtration. The result is illustrated in Table 3 below.

EXAMPLE 2

1000 ml of wet-process phosphoric acid having the same composition as that of Example 1, with the exception that the cadmium content was 12 mg/l, were treated in the manner described in Example 1. The results are given in Table 3 below.

EXAMPLE 3

From 100 ml of phosphoric acid, which had been purified of sulphate and which had the same composition as that in Example 2, arsenic and copper were precipitated in a first stage and the heavy metal sulphides removed by filtration. The filtered phosphoric acid was then neutralized to an Na:P molar ratio of 0.10 and admixed with 0.5 gram of commercially available $Na_2S$ and cadmium sulphide was filtered off after 2 hours as in Example 1. The results are given in Table 3 below.

TABLE 3

| Element content | Example No. 1 25 mg Cd/l one stage | Example No. 2 12 mg Cd/l one stage | Example No. 3 12 mg Cd/l two stages |
|---|---|---|---|
| $P_2O_5$, % | 45.0 | 45.0 | 45.0 |
| As, mg/l | 0.2 | 0.2 | 0.3 |
| Cu, mg/l | 0.4 | 0.5 | 0.4 |
| Cd, mg/l | 1.4 | 12.0 | 1.4 |

EXAMPLE 4

Sulphate-purified phosphoric acid, containing 45% $P_2O_5$ and, calculated per liter of acid, 16 mg As, 17 mg Cu and the following cadmium contents; 10, 20, 40 and 80 mg respectively, were neutralized to an Na:P ratio of 0.10 and admixed with 1 gram of commercially available $Na_2S$ per liter of phosphoric acid. The heavy metal sulphides were filtered off after 2 hours. The results are given in Table 4.

TABLE 4

| | Phosphoric acids purified of heavy metals | | | | | | | |
|---|---|---|---|---|---|---|---|---|
| | Example 4, one stage | | | | Example 5, two stages | | | |
| Element content | 10 mg Cd/l | 20 mg Cd/l | 40 mg Cl/l | 80 mg Cl/l | 10 mg Cd/l | 20 mg Cd/l | 40 mg Cd/l | 80 mg Cd/l |
| $P_2O_5$, % | 44.8 | 45.0 | 44.6 | 44.7 | 44.8 | 44.9 | 45.0 | 44.6 |
| As. mg/l | 0.2 | 0.4 | 0.3 | 0.3 | 0.2 | 0.2 | 0.3 | 0.2 |
| Cu, mg/l | 0.4 | 0.4 | 0.5 | 0.5 | 0.3 | 0.4 | 0.5 | 0.5 |
| Cd, mg/l | 10 | 2.5 | 1.1 | 0.7 | 2.5 | 2.2 | 1.3 | 0.6 |

EXAMPLE 5

A phosphoric acid which had been purified of sulphates and which had the same composition as that of Example 4 was purified of heavy metals in two stages, whereat arsenic sulphide and copper sulphide were precipitated out and filtered off in a first stage and cadmium sulphide was precipitated out in a second stage. It will be seen from Table 5 that very small quantities of cadmium were also precipitated out in phosphoric acid in the absence of $As^{3+}$ and $Cu^{2+}$.

EXAMPLE 6

Phosphoric acids which had been purified of sulphate and which had varying $P_2O_5$ concentrations were purified of heavy metals in a single stage in which the Na:P molar ratio was 0.10 and in which the temperature was 25° and 50° C. respectively. In all cases the cadmium content of the phosphoric acids was 15 mg per 100 grams of $P_2O_5$ or ~60 mg/l. In all cases the phosphoric acid was admixed with 1 gram of commercially available $Na_2S$ per liter, and after 2 hours the heavy metal sulphides were filtered off. The results are shown in Table 5 below.

TABLE 5

| | Phosphoric acid present | | | | Purified phosphoric acid Cd, mg/l |
|---|---|---|---|---|---|
| Temp. °C. | $P_2O_5$ % | Cd/As + Cu Weight ratio | Na:P Molar ratio | Cd mg/l | |
| 25 | 42 | 5 | 0.10 | 65 | 0.2 |
| 25 | 37 | 5 | 0.10 | 55 | 0.2 |
| 25 | 31 | 5 | 0.10 | 45 | 0.2 |
| 50 | 42 | 5 | 0.10 | 65 | 0.2 |
| 50 | 37 | 5 | 0.10 | 55 | 0.2 |
| 50 | 31 | 5 | 0.10 | 45 | 0.2 |

EXAMPLE 7

Phosphoric acid which had been purified of sulphates and which contained 40 mg of Cd per liter was admixed with lime milk to a $CaO:P_2O_5$ molar ratio of 0.20, whereafter the heavy metal sulphides were precipitated out in a single stage by adding 1 gram of commercially available $Na_2S$ per liter of acid. The purified phosphoric acid contained 0.9 mg of Cd per liter.

In the following example an evaporated wet phosphoric acid produced from a different phosphate raw material than the phosphoric acid treated in Examples 1–7 was purified of heavy metals.

The phosphoric acid had the following composition:
53.0% $P_2O_5$
2.65% $SO_4$
10 mg As/l
45 mg Cu/l
14 mg Cd/l The sulphate content of the phosphoric acid was precipitated out with stoichiometric quantities of Ca-(OH)$_2$, which was added in the form of lime milk containing ~150 grams of CaO per liter. Subsequent to the precipitation of gypsum, 1 gram of commercially available $Na_2S$ was added as a 5% solution to 1 liter of suspension. After 1 hour, gypsum and heavy metal sulphides were filtered off, whereafter the phosphoric acid had the following heavy-metal composition:
46.2% $P_2O_5$
0.3 mg As/l
10 mg Cu/l
12 mg Cd/l

EXAMPLE 8

The phosphoric acid, purified of arsenic and partially purified of copper, was admixed with lime milk to obtain $CaO:P_2O_5$ molar ratios of 0.10 0.20 and 0.30, and was admixed with varying quantities of sodium sulphide, whereat the following results were obtained.

TABLE 6

| | $\frac{CaO}{P_2O_5} = 0.10$ | | | $\frac{CaO}{P_2O_5} = 0.20$ | | | $\frac{CaO}{P_2O_5} = 0.30$ | | |
|---|---|---|---|---|---|---|---|---|---|
| $Na_2S$ g/T | As mg/l | Cu mg/l | Cd mg/l | As mg/l | Cu mg | Cd mg/l | As mg/l | Cu mg/l | Cd mg/l |
| 0.5 | 0.06 | 0.1 | 8.5 | 0.06 | 0.4 | 5.8 | 0.05 | 0.2 | 1.3 |
| 1.5 | 0.06 | 0.1 | 4.4 | 0.05 | 0.1 | 1.0 | 0.05 | 0.4 | 0.9 |
| 3.0 | 0.05 | 0.1 | 1.4 | 0.05 | 0.1 | 0.5 | 0.05 | 0.4 | 0.3 |

EXAMPLE 9

In this example the non-evaporated phosphoric acid having the following composition was purified of heavy metals:
31.4% $P_2O_5$
9.2 mg As/l
18 mg Cu/l
9.2 mg Cd/l
35.5 g $SO_4^{2-}$/l

9 A

Ammonium hydroxide was added to 1000 ml of phosphoric acid in stoichiometric quantities relative to the content of sulphuric acid, whereafter further ammonium hydroxide was added to obtain an $NH_4^+/P_2O_5$ molar ratio of 0.25, whereafter 1.5 gram of $Na_2S$ was added as a 5% solution. After 2 hours at ~60° C., the heavy-metal sulphide precipitate was filtered off.

The results were: 0.19 mg of As/l, 0.2 mg of Cu/l and 0.9 mg of Cd/l.

9 B

Potassium hydroxide was added to 1000 ml of phosphoric acid in stoichiometric quantities relative to the sulphuric acid content, wherefurther potassium hydroxide was added to obtain a $K_2O/P_2O_5$ molar ratio of 0.25, whereafter 1.5 g $Na_2S$ were added, as a 5% solution. After 2 hours at ~60° C., the heavy-metal sulphides precipitated out were filtered off. The purified acid had the following heavy-metal content.
0.2 mg of As/l, 0.4 mg of Cu/l, 0.9 mg of Cd/l.

EXAMPLE 10

The method disclosed in Japanese Patent Specification No. 53075-196 for precipitating out heavy metals in Khouribga phosphoric acid with varying $P_2O_5$ concentrations was applied in this working example. A mixture of lime milk and a 10% $Na_2S$-solution was added to the phosphoric acid and the following results illustrate that cadmium sulphide was not precipitated out.

| Element | POS present | $\frac{Ca}{SO_4^{2-}} = 1.5$ $S^{2-}/Me = 25$ | $\frac{Ca}{SO_4^{2-}} = 1.5$ $S^{2-}/Me = 25$ | POS | $\frac{Ca}{SO_4^{2-}} = 1.0$ $S^{2-}/Me = 25$ |
|---|---|---|---|---|---|
| $P_2O_5$, % | 53.0 | 45.5 | 49.7 | 31.4 | 29.4 |
| As, mg/l | 14 | 0.15 | 0.23 | 9.2 | 0.1 |
| Cu, mg/l | 45 | 3.4 | 2.2 | 18 | 0.3 |
| Cd, mg/l | 14 | 12 | 13 | 9.2 | 9.0 |

It can be noted that, even after increasing the cadmium content of the phosphoric acid to 45 mg/l, no cadmium purification was obtained with the known method.

I claim:

1. A method of removing cadmium and other heavy metals from wet-process phosphoric acid produced by digesting raw phosphoric material with sulphuric acid, by precipitating out the heavy metals as sulphides, comprising first removing from the phosphoric acid any residual sulphuric acid present therein by neutralization with alkali, supplying alkali to the phosphoric acid to obtain an Me/P ratio within the range of about 0.05–0.3, where Me is the number of cation equivalents in the alkali and P is the number of phosphorous atoms in the phosphoric acid; precipitating out the heavy metals by adding a sulphide compound which is soluble in the phosphoric acid; and removing the resultant sulphide precipitate.

2. A method according to claim 1, wherein the alkali is ammonium hydroxide, potassium hydroxide or sodium hydroxide.

3. A method of removing cadmium and other heavy metals from wet-process phosphoric acid produced by digesting raw phosphoric material with sulphuric acid, by precipitating out the heavy metals as sulphides, comprising first removing from the phosphoric acid any residual sulphuric acid present therein by precipitation as a not-readily dissolved sulphate, supplying alkali to the phosphoric acid to obtain an Me/P ratio within the range of about 0.05–0.3, where Me is the number of cation equivalents in the alkali and P is the number of phosphorous atoms in the phosphoric acid; precipitating out the heavy metals by adding a sulphide compound which is soluble in the phosphoric acid; and removing the resultant sulphide precipitate.

4. A method according to claim 3, wherein the residual sulphuric acid is removed by adding a calcium compound to precipitate out gypsum, which is removed.

5. A method according to claim 4, wherein the calcium compound is calcium hydroxide or calcium carbonate.

6. A method according to one of claims 1, 4, 5, 2 or 3, wherein the sulphide compound is added in an excess quantity relative to the heavy metals to be precipitated out.

7. A method according to one of claims 1, 2, 4 or 3, wherein alkali is added to obtain an Me/P ratio within the range of about 0.1–0.2.

8. A method according to one of claims 1, 4, 5 2 or 3, wherein the sulphide compound is added in excess quantities relative to the heavy metals present, when the Cd:(As+Cu) ratio in the phosphoric acid is less than about 0.5.

9. A method according to claim 8, wherein the sulphide compound is added in an amount which equals up to 0.4–1 g $S^{2-}$ per liter of phosphoric acid.

10. A method according to claim 8 wherein the sulphide compound is added in a quantity corresponding to about 0.2 to 1 grammes of $S^{2-}$ per liter of phosphoric acid.

* * * * *